(12) United States Patent
Chen et al.

(10) Patent No.: US 12,198,297 B2
(45) Date of Patent: Jan. 14, 2025

(54) IMAGE ENLARGING APPARATUS AND METHOD HAVING SUPER RESOLUTION ENLARGING MECHANISM

(71) Applicant: REALTEK SEMICONDUCTOR CORPORATION, Hsinchu (TW)

(72) Inventors: Yen-Lin Chen, Hsinchu (TW); Cheng-Yu Kuan, Hsinchu (TW); Yi-Ting Bao, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 523 days.

(21) Appl. No.: 17/521,890

(22) Filed: Nov. 9, 2021

(65) Prior Publication Data
US 2022/0292636 A1 Sep. 15, 2022

(30) Foreign Application Priority Data
Mar. 11, 2021 (TW) .................................. 110108632

(51) Int. Cl.
| G06K 9/00 | (2022.01) |
| G06N 3/04 | (2023.01) |
| G06N 3/063 | (2023.01) |
| G06T 3/4046 | (2024.01) |
| G06T 3/4053 | (2024.01) |

(52) U.S. Cl.
CPC .............. *G06T 3/4053* (2013.01); *G06N 3/04* (2013.01); *G06N 3/063* (2013.01); *G06T 3/4046* (2013.01)

(58) Field of Classification Search
None
See application file for complete search history.

(56) References Cited

U.S. PATENT DOCUMENTS

| 2020/0034948 A1* | 1/2020 | Park .................... G06N 3/088 |
| 2021/0264566 A1 | 8/2021 | Yu et al. |
| 2022/0237735 A1* | 7/2022 | Zingade ................ G06V 20/40 |

FOREIGN PATENT DOCUMENTS

| TW | I733341 B | 7/2021 |
| WO | WO-2021075799 A1 * | 4/2021 ........... G06T 3/4076 |

* cited by examiner

*Primary Examiner* — Wei Wen Yang
(74) *Attorney, Agent, or Firm* — WPAT, PC

(57) ABSTRACT

The present invention discloses an image enlarging method having super resolution enlarging mechanism that includes the steps outlined below. An enlarging module of a neural network system receives an input image to generate an enlarged image. A front end convolutional path included in a neural network module of the neural network system receives the input image to perform convolution to generate a front end operation output result. Branching convolutional paths included in the neural network module respectively receive the front end operation output result to perform convolution to generate groups of output image residues. A mixing module of the neural network system weights the output image residues according to weighing settings related to image regions of the input image and mixes the weighted output image residues to generate a group of final output image residue such that an enhancement module enhances the enlarged image to generate an output enlarged image.

18 Claims, 2 Drawing Sheets

IMAGE ENLARGING APPARATUS AND METHOD HAVING SUPER RESOLUTION ENLARGING MECHANISM

BACKGROUND OF THE INVENTION

1. Field of the Invention

The present invention relates to an image enlarging apparatus and an image enlarging method having super resolution enlarging mechanism.

2. Description of Related Art

Conventional image enlarging technologies are not able to increase the resolution of the enlarged image. As a result, in the enlarged images generated by such technologies, blurriness pixels, unclear edges and noises can be easily observed. In recent years, super resolution imaging technologies become widely adapted in daily life, in which the object of such technologies is to obtain high-resolution (HR) images from low-resolution (LR) images while the details therein are preserved as much as possible.

Due to the improvement of the resolution of the digital display apparatus, the images can be displayed with the resolution from full HD to ultra HD or even higher resolution. As a result, the image enlarging technologies having super resolution enlarging mechanism become more and more important. How to modify the whole enlarged image and enhance the image based on regional characteristics thereof at the same time become an important issue.

SUMMARY OF THE INVENTION

In consideration of the problem of the prior art, an object of the present invention is to supply an image enlarging apparatus and an image enlarging method having super resolution enlarging mechanism.

The present invention discloses an image enlarging apparatus having super resolution enlarging mechanism that includes a storage circuit and a processing circuit. The storage circuit is configured to store a plurality of computer executable commands. The processing circuit is electrically coupled to the storage circuit and is configured to retrieve and execute the computer executable commands to operate as a neural network system comprising an enlarging module, a neural network module and an enhancing module to execute an image enlarging method. The image enlarging method includes the steps outlined below. An input image is received to perform image enlarging thereon to generate an enlarged image by the enlarging module. The input image is received by a front-end convolutional path included by the neural network module to perform convolutional operation thereon to generate a front-end operation output result. The front-end operation output result is respectively received by a plurality of branching convolutional paths included by the neural network module to perform convolutional operation thereon to generate a plurality of groups of output image residual values. The plurality of groups of the output image residual values are weighted according to a weight setting related to a plurality of image regions of the input image and mixing is performed thereon to generate a group of final output image residual values by a mixing module included by the neural network module. The enlarged image is enhanced according to the group of the final output image residual values by the enhancing module to generate an output enlarged image.

The present invention also discloses an image enlarging method having super resolution enlarging mechanism that includes steps outlined below. An input image is received to perform image enlarging thereon to generate an enlarged image by an enlarging module included by a neural network system. The input image is received by a front-end convolutional path included by a neural network module to perform convolutional operation thereon to generate a front-end operation output result, wherein the neural network module is included by the neural network system. The front-end operation output result is respectively received by a plurality of branching convolutional paths included by the neural network module to perform convolutional operation thereon to generate a plurality of groups of output image residual values. The plurality of groups of the output image residual values are weighted according to a weight setting related to a plurality of image regions of the input image and mixing is performed thereon to generate a group of final output image residual values by a mixing module included by the neural network module. The enlarged image is enhanced according to the group of the final output image residual values by an enhancing module included by the neural network system to generate an output enlarged image.

The present invention further discloses an image enlarging apparatus having super resolution enlarging mechanism that includes an enlarging circuit, a neural network circuit and an enhancing circuit. The enlarging circuit is configured to receive an input image to perform image enlarging thereon to generate an enlarged image. The neural network circuit includes a front-end convolutional path, a plurality of branching convolutional paths and a mixing circuit. The front-end convolutional path is configured to receive the input image to perform convolutional operation thereon to generate a front-end operation output result. Each of the plurality of branching convolutional paths is configured to receive the front-end operation output result to perform convolutional operation thereon to generate a plurality of groups of output image residual values. The mixing circuit is configured to weight the plurality of groups of the output image residual values according to a weight setting related to a plurality of image regions of the input image and perform mixing thereon to generate a group of final output image residual values. The enhancing circuit is configured to enhance the enlarged image according to the group of the final output image residual values.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an image enlarging apparatus and an image enlarging method having super resolution enlarging mechanism to perform deep learning on the input image based on different image characteristics to generate final output image residual values corresponding to these image characteristics, such that the enlarged image can be enhanced accordingly to accomplish image enlarging having super resolution enlarging mechanism.

Figure 1:
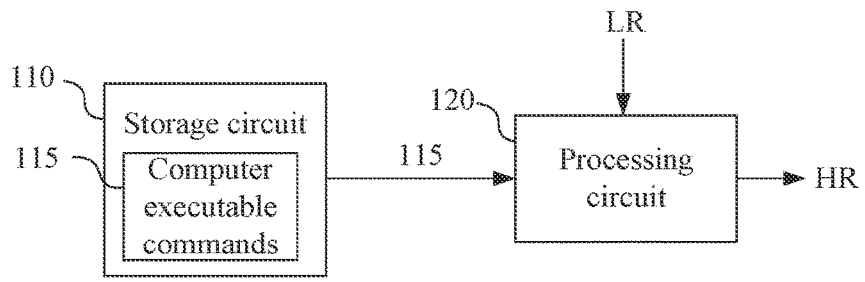
FIG. 1 illustrates a block diagram of an image enlarging apparatus having super resolution enlarging mechanism according to an embodiment of the present invention.

Reference is now made to FIG. 1. FIG. 1 illustrates a block diagram of an image enlarging apparatus 100 having super resolution enlarging mechanism according to an embodiment of the present invention. The image enlarging apparatus 100 includes a storage circuit 110 and a processing circuit 120.

In an embodiment, the storage circuit 110 can be such as, but not limited to a CD, a random access memory (RAM), a read only memory (ROM), a floppy disc, a hard drive or an optical disc. The storage circuit 110 is configured to store a plurality of computer executable commands 115.

The processing circuit 120 is electrically coupled to the storage circuit 110. In an embodiment, the processing circuit 120 is configured to retrieve and execute the computer executable commands 115 and execute the function of the image enlarging apparatus 100. More specifically, the processing circuit 120 performs super resolution image enlarging on an input image LR having a lower resolution by using deep learning mechanism, to generate an output enlarged image HR. When a size of the input image LR is W×H and an enlargement ratio is n, a size of the output enlarged image HR is nW×nH.

The operation of the image enlarging apparatus 100 is further described in the following paragraphs in accompany with FIG. 2 and FIG. 3 at the same time.

Figure 2:
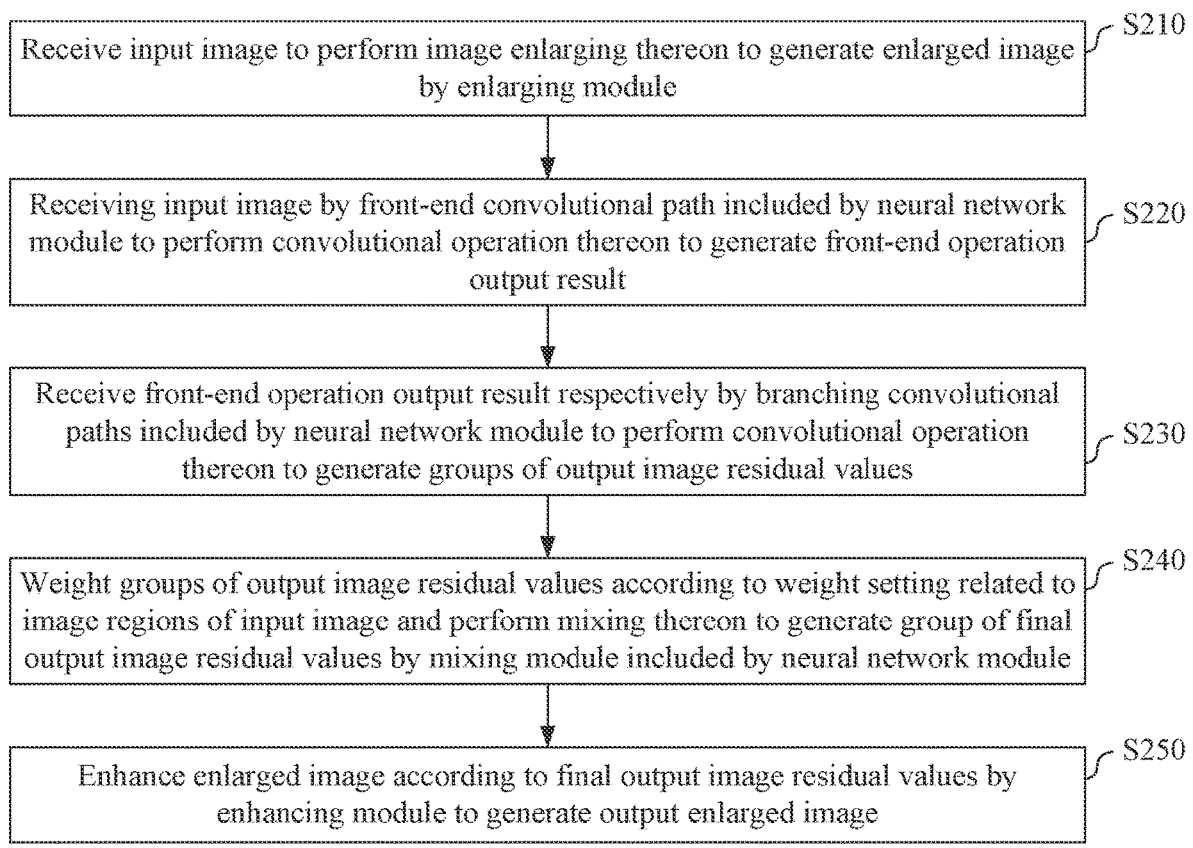
FIG. 2 illustrates a flow chart of an image enlarging method having super resolution enlarging mechanism according to an embodiment of the present invention.

FIG. 2 illustrates a flow chart of an image enlarging method 200 having super resolution enlarging mechanism according to an embodiment of the present invention. The image enlarging method 200 can be used in the image enlarging apparatus 100 as illustrated in FIG. 1, or can be implemented by using other hardware components such as a database, a normal processor, a computer, a server or other unique hardware devices having specific logic circuits or equipments having specific functions, e.g., a unique hardware integrating computer codes and processor/chip.

More specifically, the image enlarging method 200 can be implemented by computer programs to control the components in the image enlarging apparatus 100. The computer programs can be stored in a non-transitory computer readable medium, such as a read-only memory, a flash memory a floppy disc, a hard disc, an optical disc, a flash drive, a magnetic tape, a database accessible from network or other computer readable medium having the same function that is known by those skilled in the art.

Figure 3:
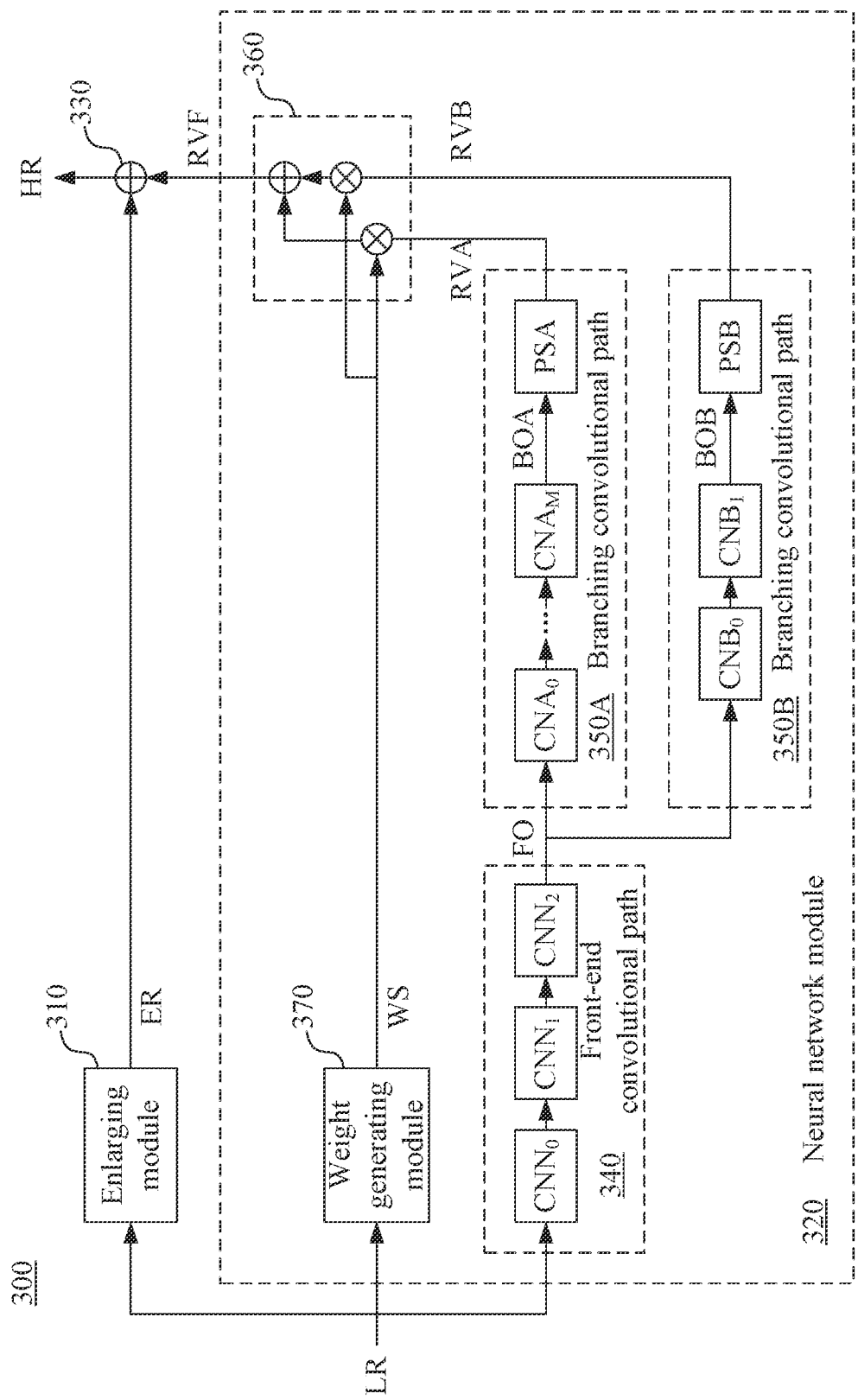
FIG. 3 illustrates a block diagram of a neural network system implemented based on the operation of the image enlarging apparatus according to an embodiment of the present invention.

FIG. 3 illustrates a block diagram of a neural network system 300 implemented based on the operation of the image enlarging apparatus 100 according to an embodiment of the present invention. More specifically, when the computer executable commands 115 are executed by the processing circuit 120, the computer executable commands 115 are operated as the neural network system 300 to execute the image enlarging method 200. In other words, modules in the neural network system 300 in FIG. 3 can be implemented by the software operated by the processing circuit 120. However, the present invention does not exclude the embodiments that use firmware or hardware (such as, but not limited to units of a microprocessor, an application specific integrated circuit (ASIC), a programmable logic device (PLD) or a combination thereof) to replace one or more than one module thereof, e.g., the unique hardware integrating computer codes and processor/chip.

In an embodiment, the neural network system 300 includes an enlarging module 310, neural network module 320 and an enhancing module 330. The neural network module 320 includes a front-end convolutional path 340, a branching convolutional path 350A, a branching convolutional path 350B, a mixing module 360 and a weight generating module 370.

The image enlarging method 200 includes steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step S210, the input image LR is received to perform image enlarging thereon to generate an enlarged image ER by the enlarging module 310.

In an embodiment, the enlarging module 310 may use any suitable operation mechanism to perform image enlarging, such as but not limited to perform interpolation operation based on the pixels included in the input image LR. In an embodiment, when the size of the input image LR is W×H and the enlargement ratio is n, the size of the enlarged image ER is nW×nH.

In step S220, the input image LR is received by the front-end convolutional path 340 included by the neural network module 320 to perform convolutional operation thereon to generate a front-end operation output result FO.

In an embodiment, the front-end convolutional path 340 includes a plurality of front-end convolutional units $CNN_0 \sim CNN_2$ connected in series. The front-end convolutional unit $CNN_0$ corresponds to a head layer and includes a single convolutional layer. Each of the front-end convolutional units $CNN_1$ and $CNN_2$ corresponds to a residual block and includes one or more than one convolutional layer. The front-end convolutional units $CNN_0 \sim CNN_2$ performs convolutional operation on the input image LR in series to generate the front-end operation output result FO.

It is appreciated that the number of the front-end convolutional units illustrated in FIG. 3 is merely an example. In different embodiments, the number of the front-end convolutional units included in the front-end convolutional path 340 can be any number that is one or more than one.

In step S230, the front-end operation output result FO is respectively received by the branching convolutional paths included by the neural network module 320 to perform convolutional operation thereon to generate a plurality of groups of output image residual values.

In the present embodiment, the neural network module 320 includes two branching convolutional paths, which are a branching convolutional path 350A and a branching convolutional path 350B. Each of the branching convolutional path 350A and the branching convolutional path 350B includes a plurality of branching convolutional units connected in series and a pixel reconstruction unit.

The branching convolutional path 350A includes branching convolutional units $CNA_0 \sim CNA_M$ and a pixel reconstruction unit PSA.

Each of the branching convolutional units $CNA_2 \sim CNA_{M-1}$ corresponds to a residual block and includes one or more than one convolutional layer. The branching convolutional unit $CNA_M$ corresponds to a tail layer and includes a single convolutional layer. The branching convolutional units $CNA_0 \sim CNA_M$ perform convolutional operation on the front-end operation output result FO is series to generate a branching operation output result BOA.

In an embodiment, the branching operation output result BOA includes n×n pieces of data having the size of W×H. The pixel reconstruction unit PSA further performs pixel reconstruction on the branching operation output result BOA to generate a piece of data having the size of nW×nH as a group of output image residual values RVA.

The branching convolutional path 350B includes branching convolutional units $CNB_0 \sim CNB_1$ and a pixel reconstruction unit PSB.

The branching convolutional unit $CNB_0$ corresponds to a residual block and includes one or more than one convolutional layer. The branching convolutional unit $CNB_1$ corresponds to a tail layer and includes a single convolutional layer. The branching convolutional units $CNB_0 \sim CNB_1$ perform convolutional operation on the front-end operation output result FO in series to generate a branching operation output result BOB.

In an embodiment, the branching operation output result BOB includes n× n pieces of data having the size of W×H. The pixel reconstruction unit PSB further performs pixel reconstruction on the branching operation output result BOB to generate a piece of data having the size of nW×nH as a group of output image residual values RVB.

In an embodiment, each of the convolutional units included in the branching convolutional path 350A and the branching convolutional path 350B performs convolutional operation according to a plurality of groups of convolutional operation parameters. Each of the groups of the convolutional operation parameters corresponds to one of a plurality of image characteristics of the input image RL. The image characteristics can be such as, but not limited to edges, textures or a combination thereof.

For example, the branching convolutional path 350A is configured to perform training specifically related to the edges of objects such that the output image residual values RVA enhance the edges of the objects, to make the edges clearer, having lesser noise and smoother. On the contrary, the branching convolutional path 350B is configured to perform training specifically related to the textures of the objects such that the output image residual values RVB enhance the textures of the objects, to make the texture more obvious.

It is appreciated that the corresponding relation between the branching convolutional paths and the image characteristics described above is merely an example. In other embodiments, the branching convolutional paths may correspond to other types of image characteristics such that the enhancement of these characteristics can be obtained through the use of deep learning.

Furthermore, the number and the configuration of the branching convolutional paths illustrated in FIG. 3 are merely an example. In different embodiments, the number of the branching convolutional paths included in the neural network module 320 can be any number that is two or more than two to perform deep learning specifically related to different image characteristics. Moreover, in different embodiments, the number of the convolutional units included in each of the branching convolutional paths can be any number that is one or more than one.

In step S240, the group of the output image residual values RVA and the group of the output image residual values RVB are weighted according to a weight setting WS related to a plurality of image regions of the input image RL, and mixing is performed thereon to generate a group of final output image residual values RVF by the mixing module 360 included by the neural network module 320.

In an embodiment, the weight setting WS is generated by a weight generating module 370 included by the neural network module 320. More specifically, the weight generating module 370 is configured to receive the input image LR to determine an image regional characteristic of each of the image regions included in the input image LR corresponding to the image characteristics.

For example, the weight generating module 370 may include a high-pass filter, a Sobel filter used to perform edge detection, an object edge direction determining unit or a combination thereof to distinguish the object edges and the texture regions in the input image LR. In another example, the weight generating module 370 may also include a color determining unit, an image segmentation unit or a combination thereof to distinguish different objects, e.g., sky or grass.

Further, the weight generating module 370 generates a plurality of weights corresponding to the groups of the output image residual values RVA and the groups of the output image residual values RVB according to the image regional characteristic, such that the weights serve as the weight setting WS.

In an example, for the regions that belong to the edges of the objects in the input image LR, the weight generating module 370 may assign larger weights to the output image residual values RVA. For the regions that correspond to the textures of the objects in the input image LR, the weight generating module 370 may assign larger weights to the output image residual values RVB.

In another example, the weight generating module 370 may distinguish the colors and the objects in the input image LR and determines the corresponding image characteristics based on the distinguished objects. For example, the weight generating module 370 may distinguish the grass and the trees regions and other regions in the input image LR, and enhance the edges of the grass and the trees regions. Under such a condition, for the grass and the trees regions in the input image LR, the weight generating module 370 assigns larger weights to the output image residual values RVA. For the other regions in the input image LR, the weight generating module 370 assigns larger weight to the output image residual values RVB.

As a result, the mixing module 360 can weight the output image residual values RVA and the output image residual values RVB by using the weight setting WS generated based on the image regional characteristic of each of the image regions. The weighted results can be mixed by using operations such as, but not limited to superimposition and/or multiplication to generate the group of final output image residual values RVF. The final output image residual values RVF include a piece of data having the size of nW×nH.

In step S250, the enlarged image ER is enhanced according to the group of the final output image residual values RVF by the enhancing module 330 to generate an output enlarged image HR. In an embodiment, the enhancing module 330 is configured to perform operations such as, but not limited to superimposition and/or multiplication on the final output image residual values RVF and the corresponding pixels of the enlarged image ER to generate the output enlarged image HR. The size of the output enlarged image HR is nW×nH.

It is appreciated that the embodiments described above are merely an example. In other embodiments, it should be appreciated that many modifications and changes may be made by those of ordinary skill in the art without departing, from the spirit of the disclosure.

In summary, the image enlarging apparatus and the image enlarging method having super resolution enlarging mechanism of the present invention performs deep learning on the input image based on different image characteristics to generate final output image residual values corresponding to these image characteristics, such that the enlarged image can be enhanced accordingly to accomplish image enlarging having super resolution enlarging mechanism.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An image enlarging apparatus having super resolution enlarging mechanism, comprising:
    a storage circuit configured to store a plurality of computer executable commands; and
    a processing circuit electrically coupled to the storage circuit and configured to retrieve and execute the computer executable commands to operate as a neural network system comprising an enlarging module, a neural network module and an enhancing module to execute an image enlarging method comprising:
        receiving an input image to perform image enlarging thereon to generate an enlarged image by the enlarging module;
        receiving the input image by a front-end convolutional path comprised by the neural network module to perform convolutional operation thereon to generate a front-end operation output result;
        receiving the front-end operation output result respectively by a plurality of branching convolutional paths comprised by the neural network module to perform convolutional operation thereon to generate a plurality of groups of output image residual values;
        weighting the plurality of groups of the output image residual values according to a weight setting related to a plurality of image regions of the input image and performing mixing thereon to generate a group of final output image residual values by a mixing module comprised by the neural network module; and
        enhancing the enlarged image according to the group of the final output image residual values by the enhancing module to generate an output enlarged image.

2. The image enlarging apparatus of claim 1, wherein the image enlarging method further comprises:
    performing convolutional operation on the input image by a plurality of front-end convolutional units connected in series comprised by the front-end convolutional path to generate the front-end operation output result;
    performing convolutional operation on the front-end operation output result by a plurality of branching convolutional units connected in series comprised by each of the branching convolutional paths to generate a branching operation output result; and
    performing pixel reconstruction on the branching operation output result by a pixel reconstruction unit comprised by each of the branching convolutional paths to generate one of the plurality of groups of the output image residual values.

3. The image enlarging apparatus of claim 2, wherein when a size of the input image is W×H and an enlargement ratio is n, the size of the enlarged image is nW×nH, the branching operation output result comprises n×n pieces of data having the size of W×H, each of the plurality of groups of the output image residual values comprises a piece of data having the size of nW×nH, the group of the final output image residual values comprises a piece of data having the size of nW×nH, and the size of the output enlarged image generated by the enhancing module is nW×nH.

4. The image enlarging apparatus of claim 1, wherein each of the branching convolutional paths performs convolutional operation according to a plurality of groups of convolutional operation parameters, and each of the plurality of groups of the convolutional operation parameters corresponds to one of a plurality of image characteristics of the input image.

5. The image enlarging apparatus of claim 4, wherein the neural network module further comprises a weight generating module, and the image enlarging method further comprises:
    receiving the input image by the weight generating module to determine an image regional characteristic of each of the image regions corresponding to the image characteristics; and
    generating a plurality of weights corresponding to the plurality of groups of the output image residual values according to the image regional characteristic by the weight generating module, such that the weights serve as the weight setting.

6. The image enlarging apparatus of claim 5, wherein the image enlarging method further comprises:
    weighting the output image residual values based on the weight setting according to the image regional characteristic of each of the image regions to generate a weighted result and superimposing the weighted result on the enlarged image to generate the output enlarged image by the mixing module.

7. An image enlarging method having super resolution enlarging mechanism comprising:
    receiving an input image to perform image enlarging thereon to generate an enlarged image by an enlarging module comprised by a neural network system;
    receiving the input image by a front-end convolutional path comprised by a neural network module to perform convolutional operation thereon to generate a front-end operation output result, wherein the neural network module is comprised by the neural network system;
    receiving the front-end operation output result respectively by a plurality of branching convolutional paths comprised by the neural network module to perform convolutional operation thereon to generate a plurality of groups of output image residual values;
    weighting the plurality of groups of the output image residual values according to a weight setting related to a plurality of image regions of the input image and performing mixing thereon to generate a group of final output image residual values by a mixing module comprised by the neural network module; and
    enhancing the enlarged image according to the group of the final output image residual values by an enhancing module comprised by the neural network system to generate an output enlarged image.

8. The image enlarging method of claim 7, further comprising:
    performing convolutional operation on the input image by a plurality of front-end convolutional units connected in series comprised by the front-end convolutional path to generate the front-end operation output result;

performing convolutional operation on the front-end operation output result by a plurality of branching convolutional units connected in series comprised by each of the branching convolutional paths to generate a branching operation output result; and performing pixel reconstruction on the branching operation output result by a pixel reconstruction unit comprised by each of the branching convolutional paths to generate one of the plurality of groups of the output image residual values.

9. The image enlarging method of claim 8, wherein when a size of the input image is W×H and an enlargement ratio is n, the size of the enlarged image is nW×nH, the branching operation output result comprises n×n pieces of data having the size of W×H, each of the plurality of groups of the output image residual values comprises a piece of data having the size of nW×nH, the group of the final output image residual values comprises a piece of data having the size of nW×nH, and the size of the output enlarged image generated by the enhancing module is nW×nH.

10. The image enlarging method of claim 7, wherein each of the branching convolutional paths performs convolutional operation according to a plurality of groups of convolutional operation parameters, and each of the plurality of groups of the convolutional operation parameters corresponds to one of a plurality of image characteristics of the input image.

11. The image enlarging method of claim 10, further comprising:
receiving the input image by a weight generating module further comprised by the neural network module to determine an image regional characteristic of each of the image regions corresponding to the image characteristics; and
generating a plurality of weights corresponding to the plurality of groups of the output image residual values according to the image regional characteristic by the weight generating module, such that the weights serve as the weight setting.

12. The image enlarging method of claim 11, further comprising:
weighting the output image residual values based on the weight setting according to the image regional characteristic of each of the image regions to generate a weighted result and superimposing the weighted result on the enlarged image to generate the output enlarged image by the mixing module.

13. An image enlarging apparatus having super resolution enlarging mechanism, comprising:
an enlarging circuit configured to receive an input image to perform image enlarging thereon to generate an enlarged image;
a neural network circuit comprising:
a front-end convolutional path configured to receive the input image to perform convolutional operation thereon to generate a front-end operation output result;
a plurality of branching convolutional paths each configured to receive the front-end operation output result to perform convolutional operation thereon to generate a plurality of groups of output image residual values; and
a mixing circuit configured to weight the plurality of groups of the output image residual values according to a weight setting related to a plurality of image regions of the input image and perform mixing thereon to generate a group of final output image residual values; and
an enhancing circuit configured to enhance the enlarged image according to the group of the final output image residual values.

14. The image enlarging apparatus of claim 13, wherein the front-end convolutional path further comprises a plurality of front-end convolutional units connected in series and configured to perform convolutional operation on the input image, to generate the front-end operation output result, and each of the branching convolutional paths comprises:
a plurality of branching convolutional units connected in series and configured to perform convolutional operation on the front-end operation output result, to generate a branching operation output result; and
a pixel reconstruction unit configured to perform pixel reconstruction on the branching operation output result, to generate one of the plurality of groups of the output image residual values.

15. The image enlarging apparatus of claim 14, wherein when a size of the input image is W×H and an enlargement ratio is n, the size of the enlarged image is nW×nH, the branching operation output result comprises n× n pieces of data having the size of W×H, each of the plurality of groups of the output image residual values comprises a piece of data having the size of nW×nH, the group of the final output image residual values comprises a piece of data having the size of nW×nH, and the size of the output enlarged image generated by the enhancing circuit is nW×nH.

16. The image enlarging apparatus of claim 13, wherein each of the branching convolutional paths performs convolutional operation according to a plurality of groups of convolutional operation parameters, and each of the plurality of groups of the convolutional operation parameters corresponds to one of a plurality of image characteristics of the input image.

17. The image enlarging apparatus of claim 16, wherein the neural network circuit further comprises a weight generating circuit configured to receive the input image to determine an image regional characteristic of each of the image regions corresponding to the image characteristics, and generate a plurality of weights corresponding to the plurality of groups of the output image residual values according to the image regional characteristic, such that the weights serve as the weight setting.

18. The image enlarging apparatus of claim 17, wherein the mixing module is further configured to weight the output image residual values based on the weight setting according to the image regional characteristic of each of the image regions to generate a weighted result and superimpose the weighted result on the enlarged image to generate the output enlarged image.

* * * * *